United States Patent
Yu et al.

(10) Patent No.: US 10,909,718 B2
(45) Date of Patent: Feb. 2, 2021

(54) METHOD FOR ESTIMATING BODY ORIENTATION

(71) Applicant: FUJITSU LIMITED, Kawasaki (JP)

(72) Inventors: Shanshan Yu, Kawasaki (JP); Norihiro Kakuko, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 16/373,586

(22) Filed: Apr. 2, 2019

(65) Prior Publication Data
US 2019/0318500 A1    Oct. 17, 2019

(30) Foreign Application Priority Data
Apr. 17, 2018 (JP) ................. 2018-079220

(51) Int. Cl.
*G06T 7/73* (2017.01)
*G06T 7/246* (2017.01)

(52) U.S. Cl.
CPC ............. *G06T 7/73* (2017.01); *G06T 7/246* (2017.01); *G06T 2207/30196* (2013.01)

(58) Field of Classification Search
CPC . G06T 7/246; G06T 7/73; G06T 2207/30196; G06K 9/00369
See application file for complete search history.

(56) References Cited

U.S. PATENT DOCUMENTS

| | | | | |
|---|---|---|---|---|
| 7,324,670 B2* | 1/2008 | Kozakaya | ........... | G06K 9/00228 382/115 |
| 2008/0187175 A1* | 8/2008 | Kim | ........................ | G06T 7/38 382/103 |
| 2012/0275648 A1* | 11/2012 | Guan | ................. | H04N 5/23254 382/103 |
| 2020/0297243 A1* | 9/2020 | Katsuhara | ............ | A61B 5/0024 |

FOREIGN PATENT DOCUMENTS

| | | | | |
|---|---|---|---|---|
| JP | 2005-018654 | 1/2005 | | |
| JP | 2010-183601 | 8/2010 | | |
| JP | 2012-239156 | 12/2012 | | |
| WO | WO-2012077287 A1 * | 6/2012 | ......... | G06K 9/00335 |
| WO | WO-2018179202 A1 * | 10/2018 | ............ | G08B 25/00 |

* cited by examiner

*Primary Examiner* — Pinalben Patel
(74) *Attorney, Agent, or Firm* — Fujitsu Patent Center

(57) ABSTRACT

A method for estimating body orientation includes: executing extraction processing for extracting a person region from images; executing an identification processing for identifying a left site and a right site in the person region; executing calculation processing for calculating a left moving amount and a right moving amount; and executing estimation processing for estimating body orientation in the person region based on a first difference and relation information, the first difference being a difference between the left moving amount and the right moving amount, the relation information including first and second relation information, the first relation information indicating a relationship between the first difference and a change amount when the left moving amount is larger than the right moving amount, and the (Continued)

second relation information indicating a relationship between the first difference and the change amount when the right moving amount is larger than the left moving amount.

15 Claims, 15 Drawing Sheets

FIG. 2

| ID | TIME | IMAGE |
|---|---|---|
| 1 | t1 | IM1 |
| 2 | t2 | IM2 |
| 3 | t3 | IM3 |
| 4 | t4 | IM4 |
| ... | ... | ... |
| ... | ... | ... |
| n | tn | IMn |

FIG. 4
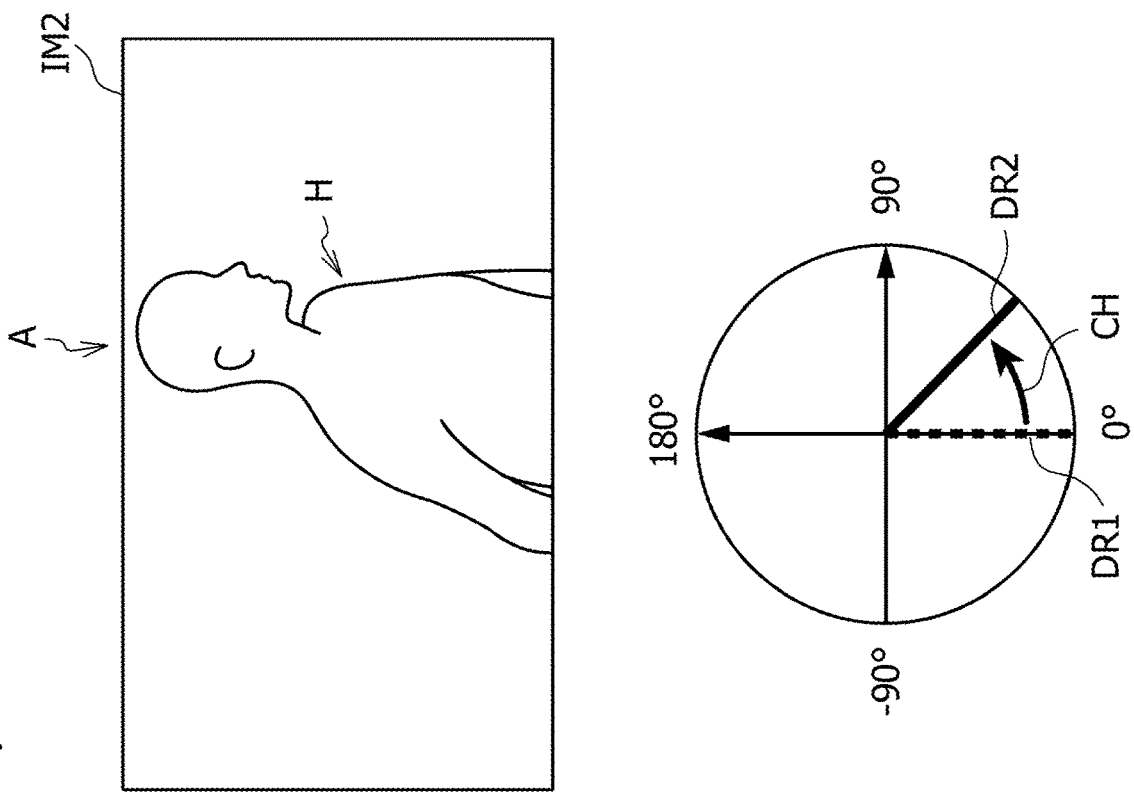
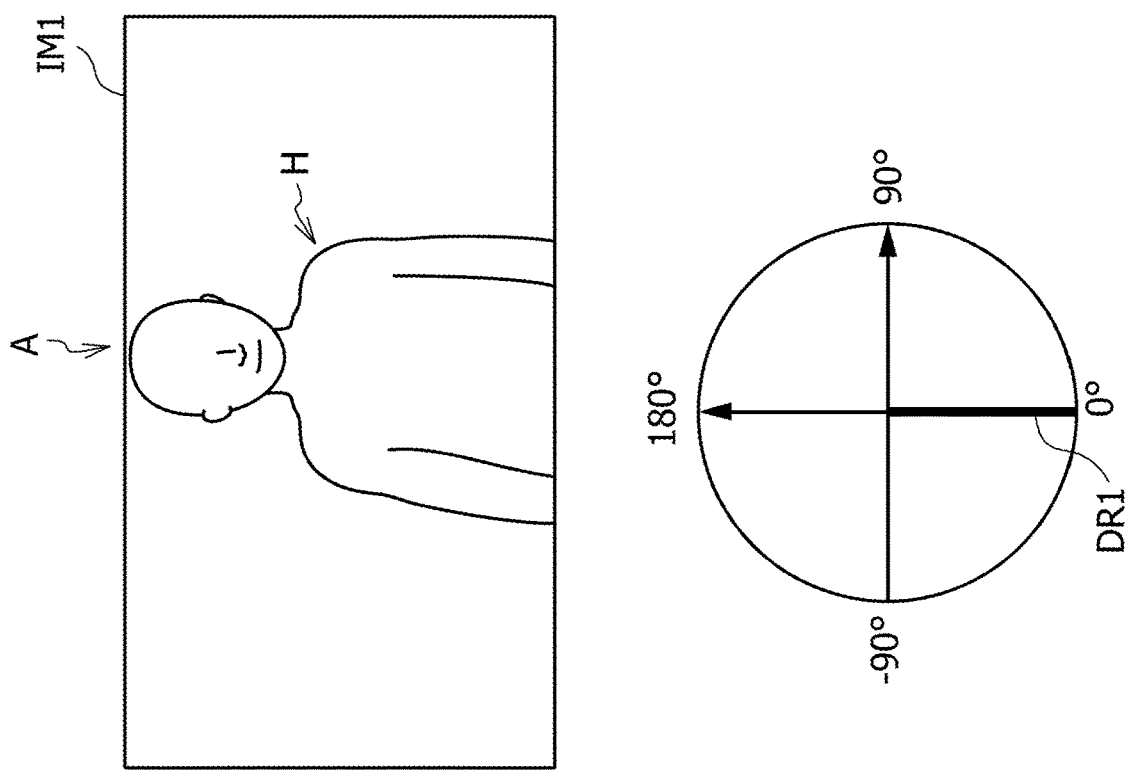

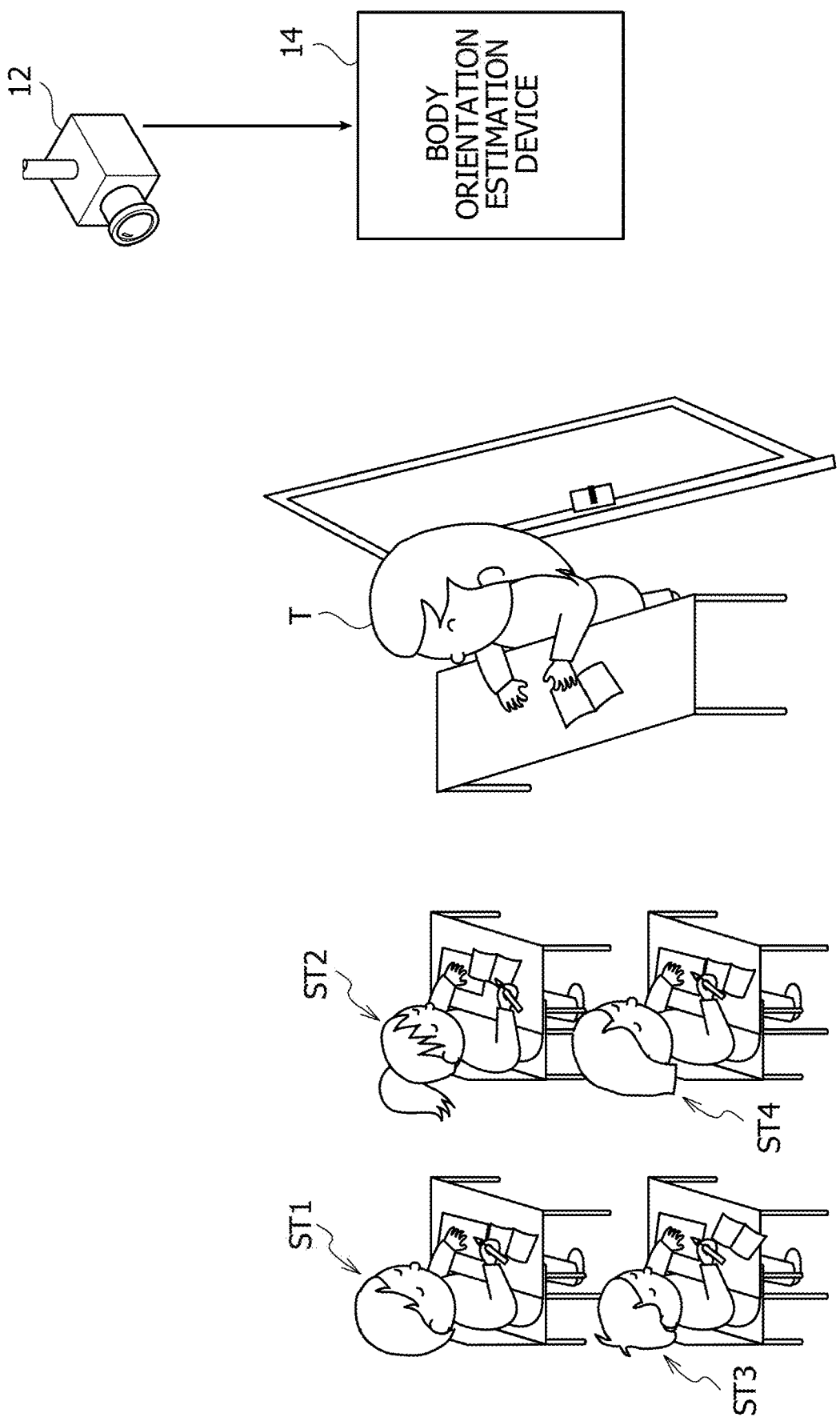

METHOD FOR ESTIMATING BODY ORIENTATION

CROSS-REFERENCE TO RELATED APPLICATION

This application is based upon and claims the benefit of priority of the prior Japanese Patent Application No. 2018-79220, filed on Apr. 17, 2018, the entire contents of which are incorporated herein by reference.

FIELD

The embodiment discussed herein is related to a method for estimating a body orientation.

BACKGROUND

A looking-off driving detection device has been conventionally known as an example of the technique of estimating the orientation of a person's face. The looking-off driving detection device takes an image of a face of a detected person. Then, the looking-off driving detection device detects an optical flow from taken face images. At this time, the looking-off driving detection device detects the optical flow from at least two face images. The looking-off driving detection device also detects a face motion vector from the detected optical flow. Then, the looking-off driving detection device detects a looking-off state of the detected person from the detected motion vector.

An imaging device that recognize a gesture and controls the action based on the gesture recognition has been also known. The imaging device detects a facial region of a subject based on image data, detects a rotational action between two pieces of image data inputted at a predetermined interval, and performs a predetermined action when the rotational action is detected. The imaging device also detects a rotational action candidate between two pieces of image data, calculate rotational center coordinates of the rotational action candidate and a rotational angle of the rotational action candidate, and determines whether or not the rotational action candidate corresponds to the rotational action based on center coordinates of the facial region, rotational center coordinates, and the rotational angle. In this case, the imaging device extracts a block with motion among blocks acquired by dividing the image data by a predetermined number of pixels between the two pieces of image data. Then, the imaging device detects a moving amount between the two pieces of image data of the block with motion as a motion vector, and calculates the rotational center coordinates and the rotational angle using the motion vector as the rotational action candidate.

The imaging device capable of taking an image in consideration of the orientation of a subject has been also known. When an imaging timing arrives, the imaging device execute imaging processing and face detection processing. Then, the imaging device performs facial detection in a certain region extended in the direction of detected facial orientation. Next facial detection is made according to this control. Then, the imaging device identifies a region shifted from the detected facial region in the direction of facial orientation as a projected region, and executes AE processing using the identified projected region as a metering region. Subsequently, the imaging device records data on the taken frame image data, and repeats action. In detecting a facial motion amount, the imaging device may detect a facial motion vector using a block matching method or the like, thereby detecting the facial motion amount.

Examples of the related art include Japanese Laid-open Patent Publication Nos. 2005-18654, 2012-239156, and 2010-183601.

SUMMARY

According to an aspect of the embodiments, a method for estimating body orientation includes: executing a region extraction processing that includes extracting a person region from a plurality of images, the person region corresponding to a region of a person, the plurality of images including an image taken at a first time and an image taken at a second time after the first time; executing an identification processing that includes identifying a left site and a right site in the person region from each image at the first time and the second time, the left site indicating the left site in the person region, and the right site indicating the right site in the person region; executing a calculation processing that includes calculating a left moving amount and a right moving amount, the left moving amount indicating a moving amount between the left site at the first time and the left site at the second time, the right moving amount indicating a moving amount between the right site at the first time and the right site at the second time; and executing an estimation processing that includes estimating body orientation of the person in the person region at the second time based on a first difference and relation information, the first difference being a difference between the left moving amount and the right moving amount, the relation information including first relation information and second relation information, the first relation information indicating a relationship between the first difference and a first change amount when the left moving amount is larger than the right moving amount, the first change amount being a body orientation change amount of the person in the person region, and the second relation information indicating a relationship between the first difference and the first change amount when the right moving amount is larger than the left moving amount.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of data format of images at respective times, which are stored in an image storage unit;

FIG. 4 is a view for describing summary of the person orientation estimation processing in this embodiment;

FIG. 15 illustrates Example in accordance with the embodiment;

DESCRIPTION OF EMBODIMENTS

As described in Patent document 1 to Patent document 3, to estimate the orientation of a person in an image, the motion vector acquired from images at each time may be used. In this case, for example, even when the person in the image slides his/her body sideways with respect to a camera, the motion vector is detected. For this reason, when the person in the image slides his/her body sideways with respect to the camera, it may be recognized that the body orientation has changed, causing wrong recognition about the estimation of the orientation of the person's body.

An object of disclosed technique from an aspect is to accurately estimate the orientation of the body of a person in an image.

An example of an embodiment disclosed herein will be described below in detail with reference to figures.

<Body Orientation Estimation System>

Figure 1:
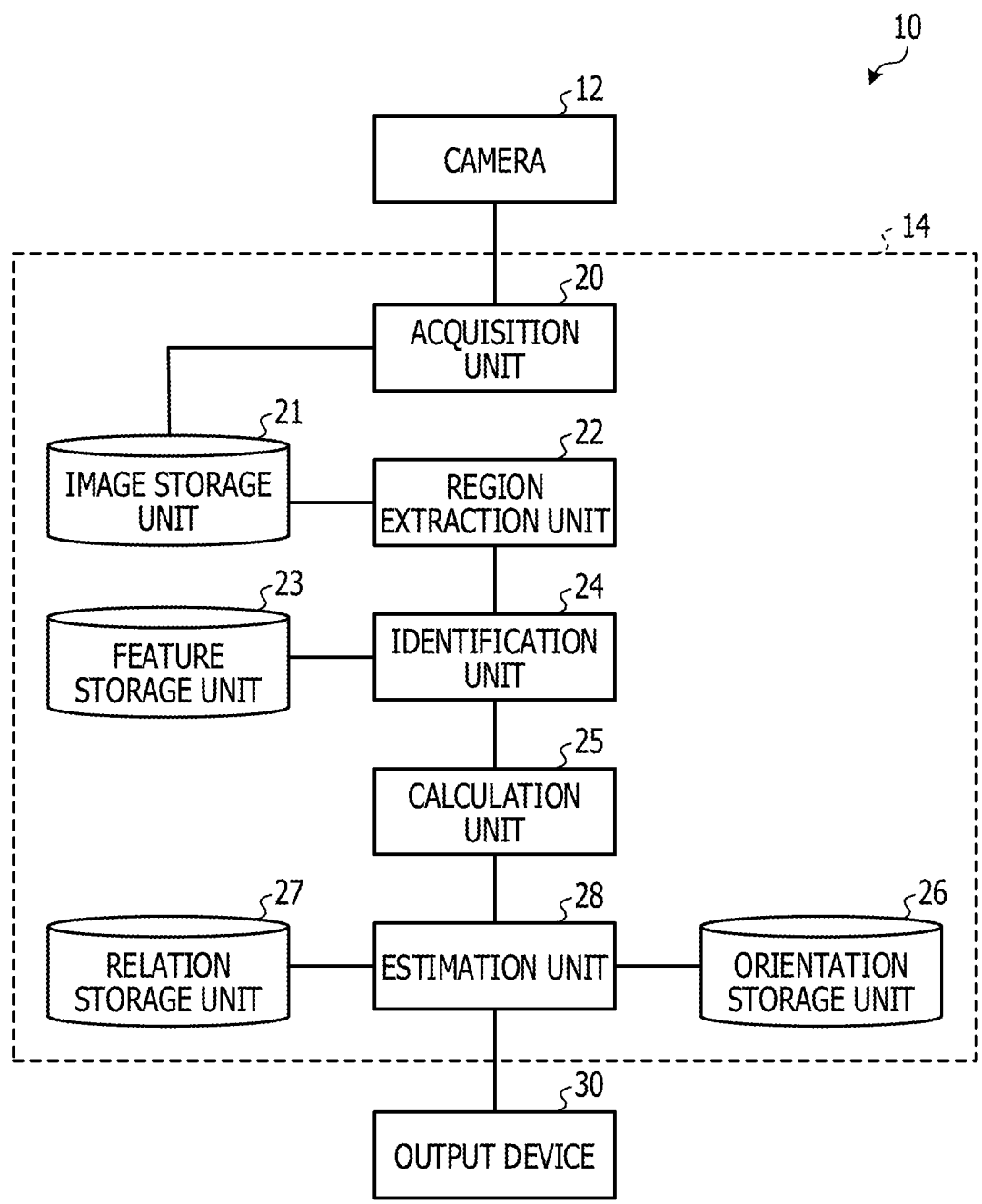
FIG. 1 is a schematic block diagram illustrating a body orientation estimation system in accordance with this embodiment.

As illustrated in FIG. 1, a body orientation estimation system 10 on accordance with an embodiment includes a camera 12, a body orientation estimation device 14, and an output device 30.

The camera 12 sequentially takes images of a person.

As illustrated in FIG. 1, the body orientation estimation device 14 includes an acquisition unit 20, an image storage unit 21, a region extraction unit 22, a feature storage unit 23, an identification unit 24, a calculation unit 25, an orientation storage unit 26, a relation storage unit 27, and an estimation unit 28. The relation storage unit 27 is an example of a storage unit of the disclosed technique.

The acquisition unit 20 sequentially acquires images taken by the camera 12. Then, the acquisition unit 20 stores the acquired images in the image storage unit 21.

The image storage unit 21 stores the image taken by the camera 12 at each time. For example, as illustrated in FIG. 2, the images at the times are stored in a table. The table illustrated in FIG. 2 stores an ID indicating identification information, time at which an image is taken, and the image corresponding to the time, which are associated with one another. For example, the table illustrated in FIG. 2 stores an image IM1 taken at a time t1 as data corresponding to ID1.

Figure 3:
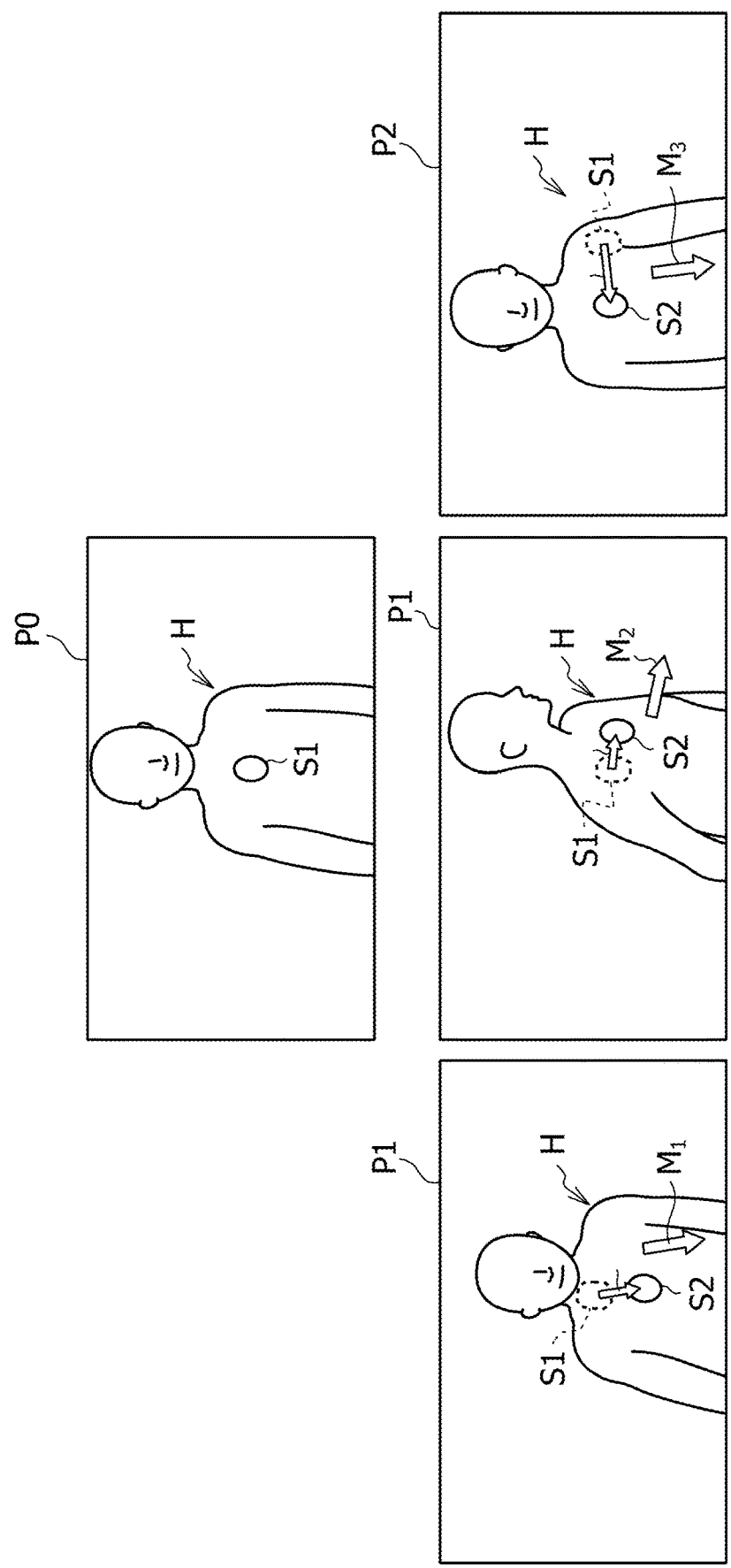
FIG. 3 is a view for describing person orientation estimation processing according to a motion vector of a particular site.

To estimate the orientation of a person in an image, the person orientation may be estimated according to the motion vector of a particular site in a person region representing the person. FIG. 3 is a view for describing person orientation estimation processing according to the motion vector of the particular site.

As an example, as illustrated in PO in FIG. 3, the body orientation of a person region H is estimated according to the motion vector of a particular site S1 in a person region H. As illustrated in P1 in FIG. 3, when the person region H in an image moves forward in the image, the particular site S1 moves and becomes a particular site S2. In this case, a motion vector D1 between the particular site S1 and the particular site S2 matches a body orientation M1. For this reason, the body orientation M1 of the person region H may be properly estimated according to the motion vector D1.

However, when the person region H rotates as illustrated in P2 in FIG. 3, a motion vector D2 between the particular site S1 and the particular site S2 matches a body orientation M2, but since the motion vector D2 is small, the body orientation corresponding to the rotation may not be properly estimated.

When the person region H moves sideways with being oriented forward as illustrated in P3 in FIG. 3, despite that the person region H is oriented forward, a motion vector D3 between the particular site S1 and the particular site S2 indicates the crosswise direction. For this reason, the motion vector D3 does not match a body orientation M3. As a result, in estimating the body orientation, wrong recognition may occur.

Thus, the body orientation estimation device 14 in accordance with this embodiment estimates the person orientation using a left site and a right site in the person region indicating the region of the person in the image. The left site and the right site are sites located bilaterally symmetric about the center line of the person region.

Figure 5:
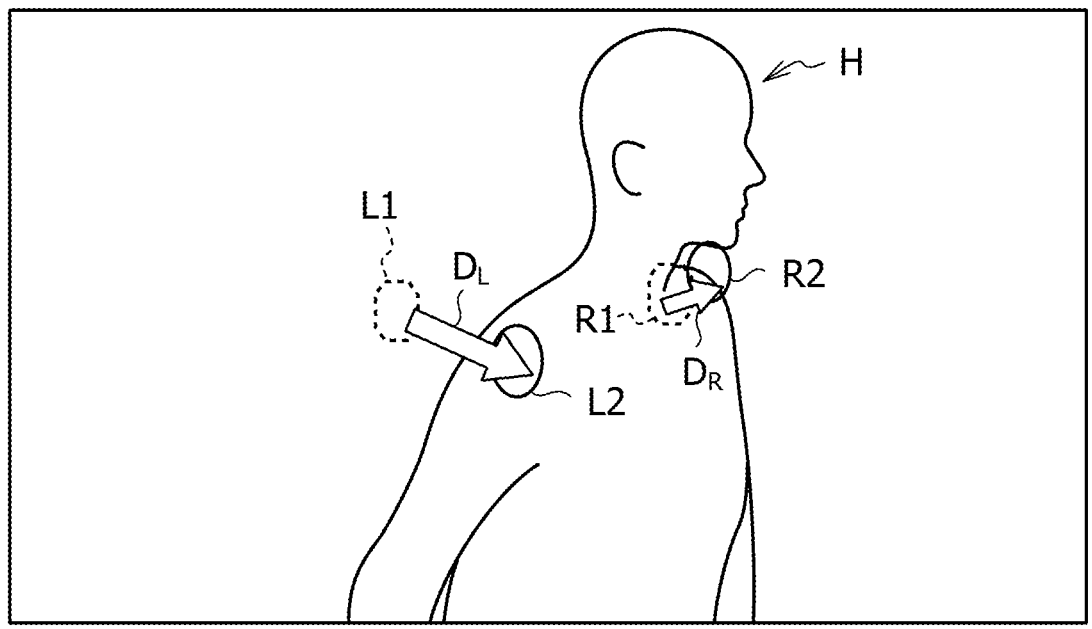
FIG. 5 is a view for describing summary of the person orientation estimation processing in this embodiment.

FIGS. 4 and 5 are views for describing summary of the person orientation estimation processing in this embodiment.

As illustrated in FIG. 4, the body orientation of the person region H in an image IM1 taken at any time (hereinafter referred to as merely "previous time") when viewed from an A direction is DR1. The body orientation of the person region H in an image IM2 taken at a time following any time (hereinafter referred to as merely "current time") when viewed from the A direction is DR2. In this embodiment, the body orientation DR2 at the current time is estimated based on the body orientation DR1 estimated at the previous time and a change amount CH of the body orientation. The previous time is an example of a first time of the disclosed technique. The current time is an example of a second time of the disclosed technique.

As illustrated in FIG. 5, the body orientation estimation device 14 in accordance with this embodiment uses a moving amount DL indicating a difference between a left site L1 at the previous time and a left site L2 at the current time, and a moving amount DR indicating a difference between a right site R1 at the previous time and a right site R2 at the current time. As illustrated in FIG. 5, when the body in the person region H rotates and the body orientation in the person region H changes to the right, the moving amount DL is larger than the moving amount DR. This is due to that the left site L2 comes close to the camera 12 and the right site R2 goes away from the camera 12. Using the moving amount DL and the moving amount DR, the body orientation estimation device 14 in accordance with this embodiment estimates the body orientation.

The region extraction unit 22 reads the image taken at the previous time and the image taken at the current time from the stored in the image storage unit 21. Then, the region extraction unit 22 extracts the person region indicating the region of the person from each of the image taken at the previous time and the image taken at the current time. For example, the region extraction unit 22 extracts the person region from the image according to the technique described in a following document.

Lubomir Bourdev and Jitendra Malik, "Poselets: Body Part Detectors Trained Using 3D Human Pose Annotations", Computer Vision, 2009 IEEE 12th. International Conference on. IEEE, 2009.

The feature storage unit 23 previously stores a feature amount of the left site indicating a left particular site in the person region and a feature amount of the right site indicating a right particular site in the person region. In this embodiment, the left site is a right shoulder site, and the right site or a left shoulder site of the person. In addition, in this embodiment, histograms of oriented gradients (HOG) feature amount is used as an example of the feature amount.

For each of the person regions at respective times, which are extracted by the region extraction unit 22, the identification unit 24 identifies the left site and the right site in the person region.

Specifically, the identification unit 24 extracts the HOG feature amounts at a plurality of feature points from the person region at each time. Then, based on the HOG feature amounts extracted from the plurality of feature points and the feature amount previously stored in the feature storage unit 23, the identification unit 24 identifies the left site in the images taken at the previous time and the current time, and the right site in the images taken at the previous time and the current time.

The calculation unit 25 calculates a left moving amount indicating the moving amount between the left site at the previous time and the left site at the current time. The calculation unit 25 also calculates a right moving amount indicating the moving amount between the right site at the previous time and the right site at the current time. For example, as illustrated in FIG. 5, the calculation unit 25 calculates the moving amount DL indicating the left moving amount and the moving amount DR indicating the right moving amount.

The orientation storage unit 26 stores the already-estimated body orientation at the previous time.

The relation storage unit 27 stores the relation between a difference between the left moving amount and the right moving amount (hereinafter referred to as merely "moving amount") and the body orientation of the person in the person region.

Figure 6:
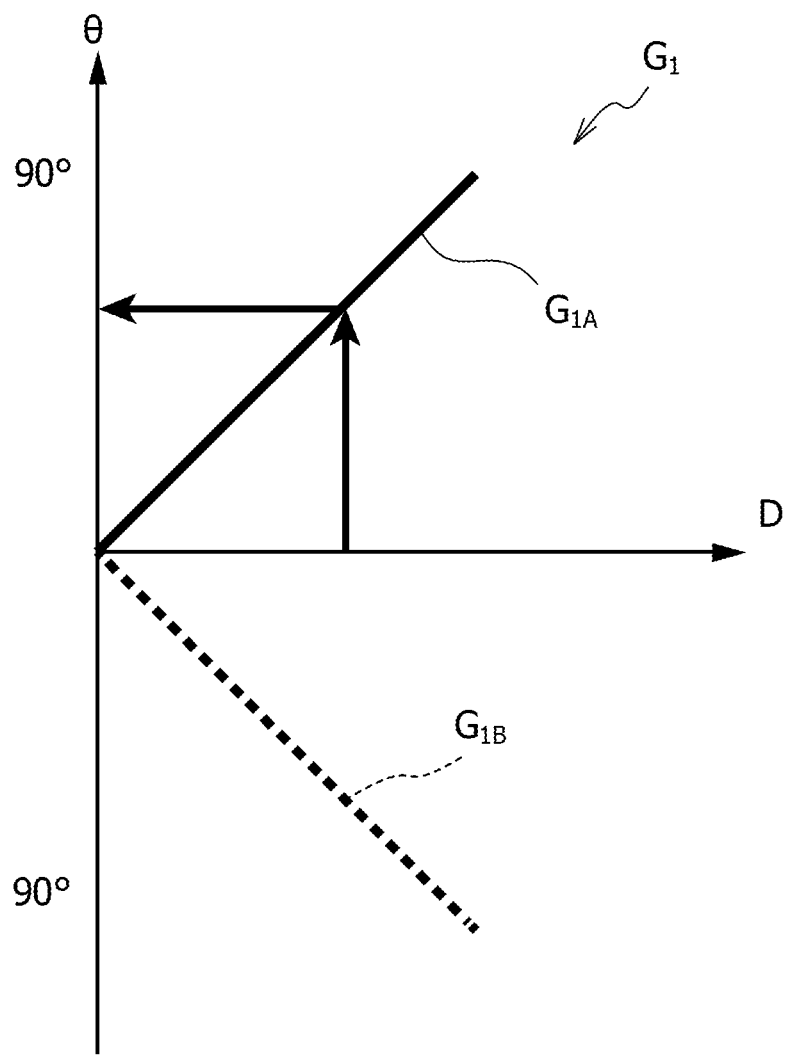
FIG. 6 illustrates an example of the relation between a moving amount difference D and a body orientation change amount θ of a person in a person region.

FIG. 6 illustrates an example of relations between a moving amount difference D and a body orientation change amount θ of the person in the person region. FIG. 6 illustrates relations G1 between the moving amount difference D and the body orientation change amount θ in the case where the body orientation at the previous time is 0 degree. The body orientation is 0 degree, which means, for example, the case where the person is oriented substantially to the front with respect to the camera 12. The relation between the moving amount difference D and the body orientation change amount θ is previously acquired a below-mentioned relation acquisition system 32. A relation G1A in FIG. 6 is the relation between the moving amount difference D and the body orientation change amount θ in the case where the person moves to the right. A relation G1B in FIG. 6 is the relation between the moving amount difference D and the body orientation change amount θ in the case where the person moves to the left.

Figure 7:
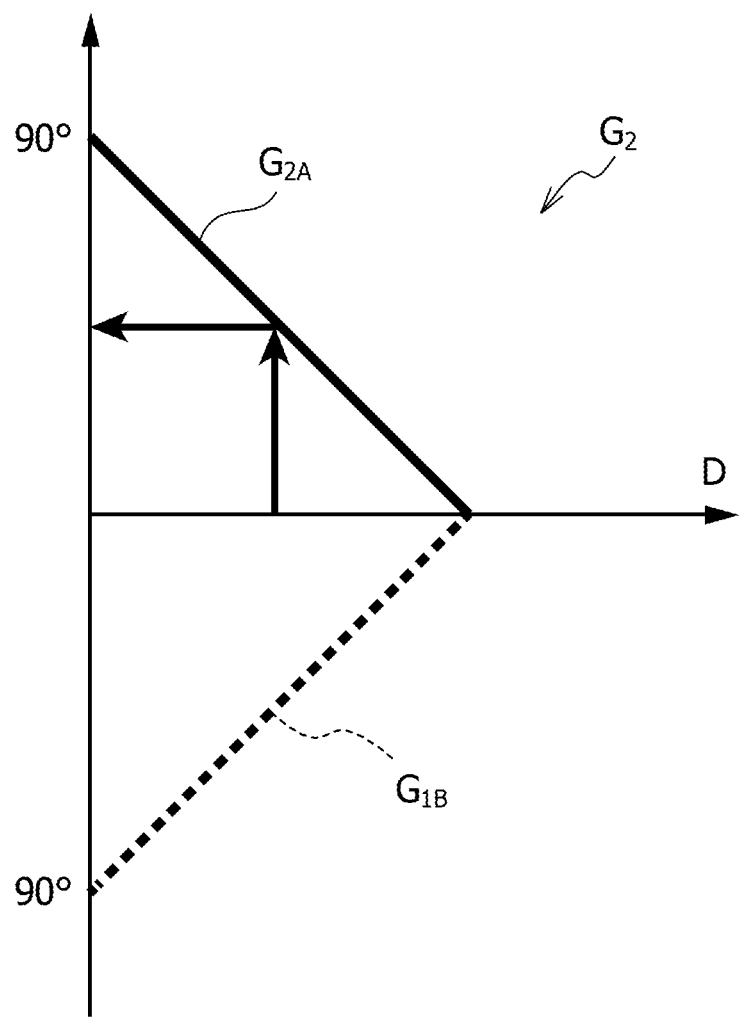
FIG. 7 illustrates an example of the relation between the moving amount difference D and the body orientation change amount θ of the person in the person region.

A plurality of relations as illustrated in FIG. 6 are prepared for each body orientation. Thus, the relation storage unit 27 stores the relation between the moving amount difference D and the body orientation change amount θ for each of the plurality of body orientations. For example, FIG. 7 illustrates relations G2 between the moving amount difference D and the body orientation change amount θ in the case where the body orientation at the previous time is 90 degrees. A relation G2A in FIG. 7 is the relation between the moving amount difference D and the body orientation change amount θ in the case where the person moves to the right. A relation G2B in FIG. 7 is the relation between the moving amount difference D and the body orientation change amount θ in the case where the person moves to the left.

The estimation unit 28 reads the already-estimated body orientation at the previous time from the orientation storage unit 26. Then, the estimation unit 28 reads the relation between the moving amount difference D and the body orientation change amount θ, which corresponds to the already-estimated body orientation at the previous time, from the relation storage unit 27. For example, the estimation unit 28 reads the relation G1 in FIG. 6 in the case where the body orientation at the previous time is 0 degree.

Then, the estimation unit 28 identifies the larger moving amount of the left moving amount and the right moving amount, which are calculated by the calculation unit 25. The estimation unit 28 also calculates the moving amount difference based on the left moving amount and the right moving amount, which are calculated by the calculation unit 25.

The estimation unit 28 selects either the relation G1A or the relation G1B in FIG. 6 according to the larger moving amount of the left moving amount and the right moving amount. For example, the estimation unit 28 selects the relation G1A in the case where the right moving amount is larger than the left moving amount. Next, the estimation unit 28 acquires a change amount from the body orientation at the previous time to the body orientation at the current time, based on the calculated moving amount difference and the relation G1A between the moving amount difference D and the body orientation change amount θ. Then, the estimation unit 28 estimates the body orientation of the person in the person region at the current time, based on the already-estimated body orientation at the previous time and the change amount from the body orientation at the previous time to the body orientation at the current time.

Figure 8:
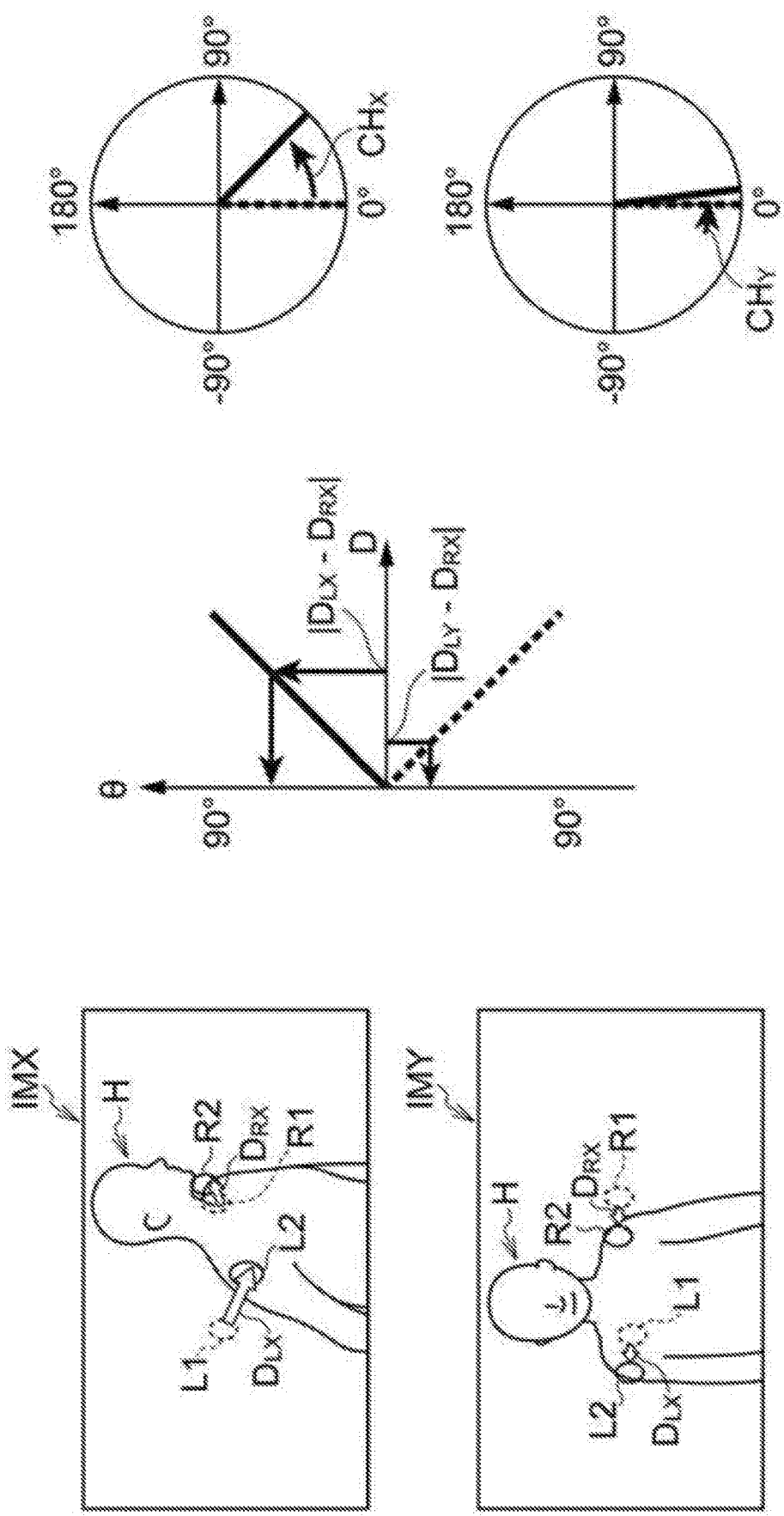
FIG. 8 is a view for descrying processing in this embodiment.

FIG. 8 is a view for describing processing in this embodiment. As illustrated in IMX in FIG. 8, when the person region H is oriented to the right in an image, DLX indicating the difference between the left site L1 at the previous time and the left site L2 at the current time is larger than DRX indicating the difference between the right site R1 at the previous time and the right site R2 at the current time. For this reason, the moving amount difference |DLX-DRX| has a small large, such that the body orientation change amount CHX is properly estimated.

As illustrated in IMY in FIG. 8, when the person region H slides in an image, the DLX indicating the difference between the left site L1 at the previous time and the left site L2 at the current time becomes substantially equal to the DRX indicating the difference between the right site R1 at the previous time and the right site R2 at the current time. As a result, the moving amount difference |DLX-DRX| has a small value and a body orientation change amount CHY has a small value. Thus, even when the person region H slides on the image in the crosswise direction, wrong estimation of the body orientation is suppressed.

The estimation unit 28 also updates the already-estimated body orientation at the previous time in the orientation storage unit 26 to the newly-estimated body orientation at the current time. To estimate the body orientation at the next time, the body orientation stored in the orientation storage unit 26 is used.

The output device 30 outputs the body orientation at the current time, which is estimated by the estimation unit 28, as a result. The output device 30 is embodied as, for example, a display.

<Relation Acquisition System>

Figure 9:
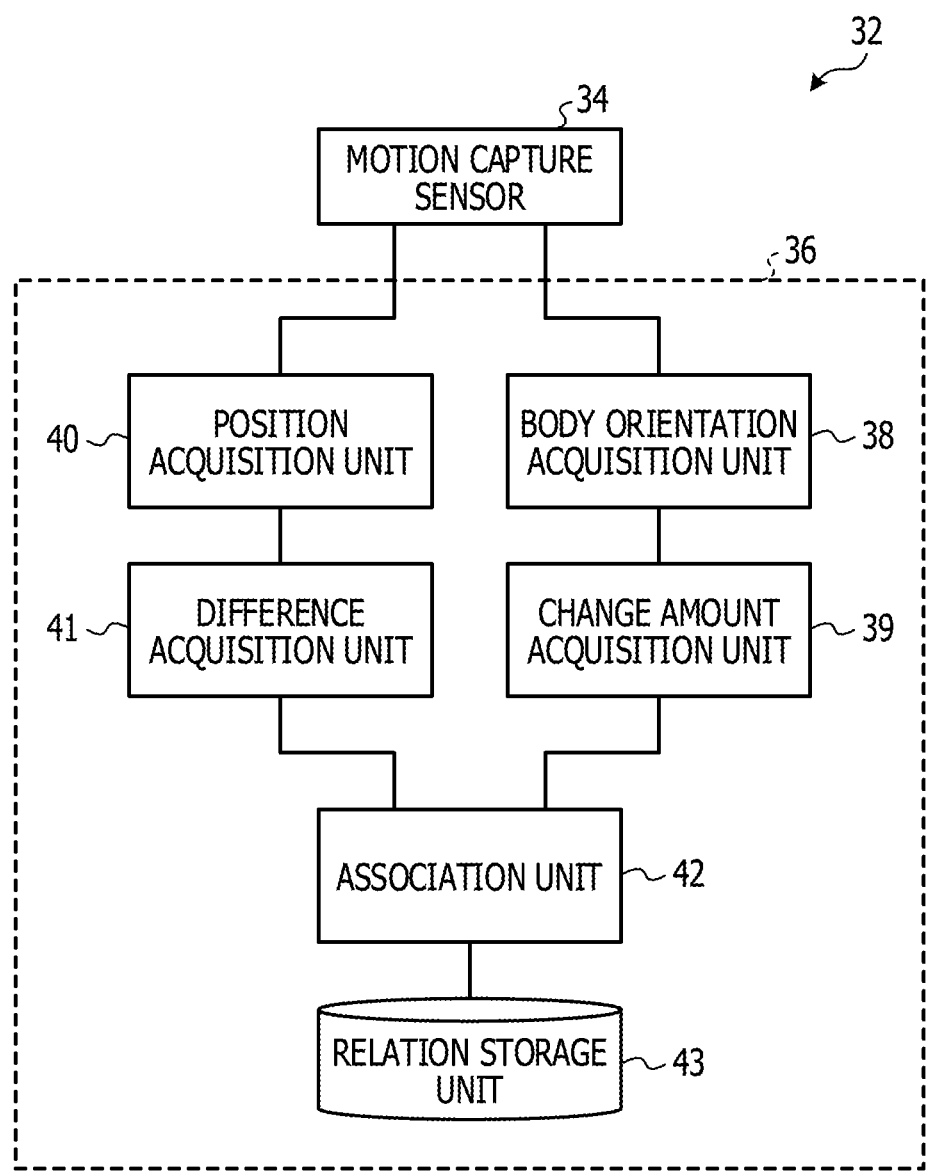
FIG. 9 is a schematic block diagram illustrating a relation acquisition system in accordance with the embodiment.

As illustrated in FIG. 9, the relation acquisition system 32 in accordance with the embodiment includes a motion capture sensor 34 and a relation acquisition device 36.

For example, the motion capture sensor 34 sequentially detects positions of markers attached positions of a person.

The relation acquisition device 36 includes a body orientation acquisition unit 38, a change amount acquisition unit 39, a position acquisition unit 40, a difference acquisition unit 41, an association unit 42, and a relation storage unit 43.

Based on the positions of the markers at each time, which are acquired by the motion capture sensor 34, the body orientation acquisition unit 38 acquires the body orientation of the person with the markers at each time. Specifically, the body orientation acquisition unit 38 acquires the body orientation at the previous time and the body orientation at the current time. For example, the body orientation acquisition unit 38 acquires the body orientation of the person based on the previously associated relation between the marker position and the body orientation.

The change amount acquisition unit 39 acquires the difference between the body orientation at the previous time and the body orientation at the current time, which is acquired by the body orientation acquisition unit 38, as the body orientation change amount.

The position acquisition unit 40 acquires the positions of the marker in the left site (for example, the right shoulder region in the person region), which are acquired by the motion capture sensor 34, at the previous time and the current time. The position acquisition unit 40 also acquires the positions of the marker in the right site (for example, the left shoulder region in the person region), which are acquired by the motion capture sensor 34, at the previous time and the current time.

The difference acquisition unit 41 acquires the left moving amount indicating the moving amount from the position of the marker in the left site at the previous time to the position of the marker in the left site at the current time, which are acquired by the position acquisition unit 40. The difference acquisition unit 41 also the right moving amount indicating the moving amount from the position of the marker in the right site at the previous time to the position of the marker in the right site at the current time, which are acquired by the position acquisition unit 40. The difference acquisition unit 41 also acquires the moving amount difference indicating the difference between the left moving amount and the right moving amount.

The association unit 42 associates the moving amount difference acquired by the difference acquisition unit 41 with the body orientation change amount acquired by the change amount acquisition unit 39, and stores them in the relation storage unit 43.

The relation storage unit 43 stores the relation between the moving amount difference and the body orientation change amount. The relation stored in the relation storage unit 43 is stored in the relation storage unit 27 of the body orientation estimation device 14.

Figure 10:
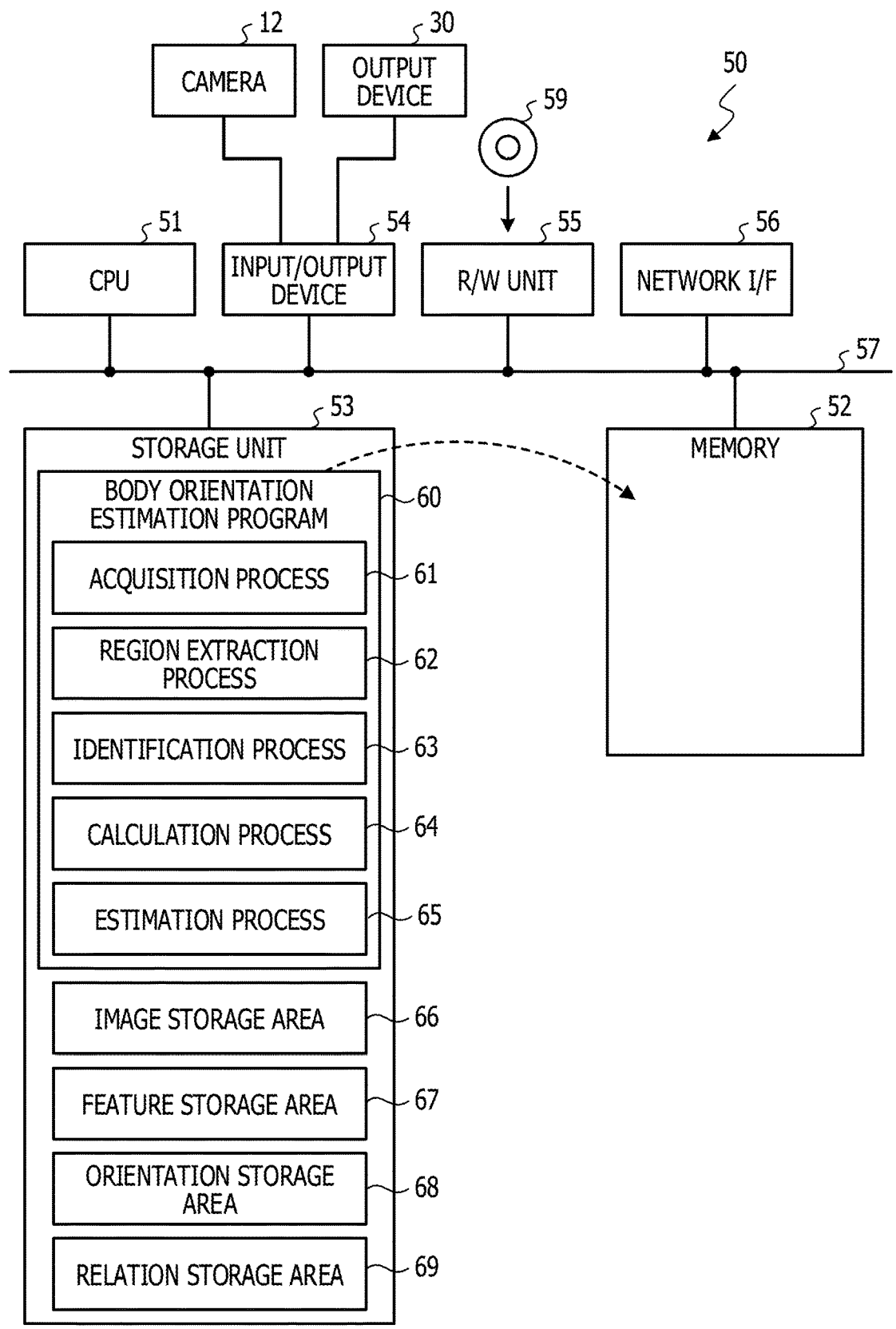
FIG. 10 is a block diagram illustrating schematic configuration of a computer that functions as a body orientation estimation device in accordance with the embodiment.

The body orientation estimation device 14 may be embodied as, for example, a computer 50 illustrated in FIG. 10. The computer 50 includes a CPU 51, a memory 52 that is a temporary storage area, and a nonvolatile storage unit 53. The computer 50 also includes an input/output interface (I/F) 54 to which the camera 12 and an input/output device such as the output device 30 are connected, and a read/write (R/W) unit 55 for controlling reading/writing data from/to a recording medium 59. The computer 50 also includes a network I/F 56 connected to the network such as the Internet. The CPU 51, the memory 52, the storage unit 53, the input/output I/F 54, the R/W unit 55, and the network I/F 56 are interconnected via a bus 57.

The storage unit 53 may be embodied as a hard disk drive (HDD), a solid state drive (SSD), a flash memory, or the like. The storage unit 53 that is a storage medium stores a body orientation estimation program 60 that causes the computer 50 to function as the body orientation estimation device 14. The body orientation estimation program 60 has an acquisition process 61, a region extraction process 62, an identification process 63, a calculation process 64, and an estimation process 65. An image storage area 66 stores information constituting the image storage unit 21. A feature storage area 67 stores information constituting the feature storage unit 23. An orientation storage area 68 stores information constituting the orientation storage unit 26. A relation storage area 69 stores information constituting the relation storage unit 27.

The CPU 51 reads the body orientation estimation program 60 from the storage unit 53, expands the read body orientation estimation program 60 into the memory 52, and sequentially executes the processes of the body orientation estimation program 60. The CPU 51 executes the acquisition process 61, thereby operating as the acquisition unit 20 illustrated in FIG. 1. The CPU 51 also executes the region extraction process 62, thereby operating as the region extraction unit 22 illustrated in FIG. 1. The CPU 51 executes the identification process 63, thereby operating as the identification unit 24 illustrated in FIG. 1. The CPU 51 also executes the calculation process 64, thereby operating as the calculation unit 25 illustrated in FIG. 1. The CPU 51 also executes the estimation process 65, thereby operating as the estimation unit 28 illustrated in FIG. 1. The CPU 51 also reads information from the image storage area 66, and expands the image storage unit 21 into the memory 52. The CPU 51 also reads information from the feature storage area 67, and expands the feature storage unit 23 into the memory 52. The CPU 51 also reads information from the orientation storage area 68, and expands the orientation storage unit 26 into the memory 52. The CPU 51 also reads information from the relation storage area 69, expands the relation storage unit 27 into the memory 52. Thereby, the computer 50 executing the body orientation estimation program 60 functions as the body orientation estimation device 14. The CPU 51 that is hardware executes the body orientation estimation program 60 that is software.

The function achieved by the body orientation estimation program 60 may be achieved by a semiconductor integrated circuit, in particular, an application specific integrated circuit (ASIC) or the like.

Figure 11:
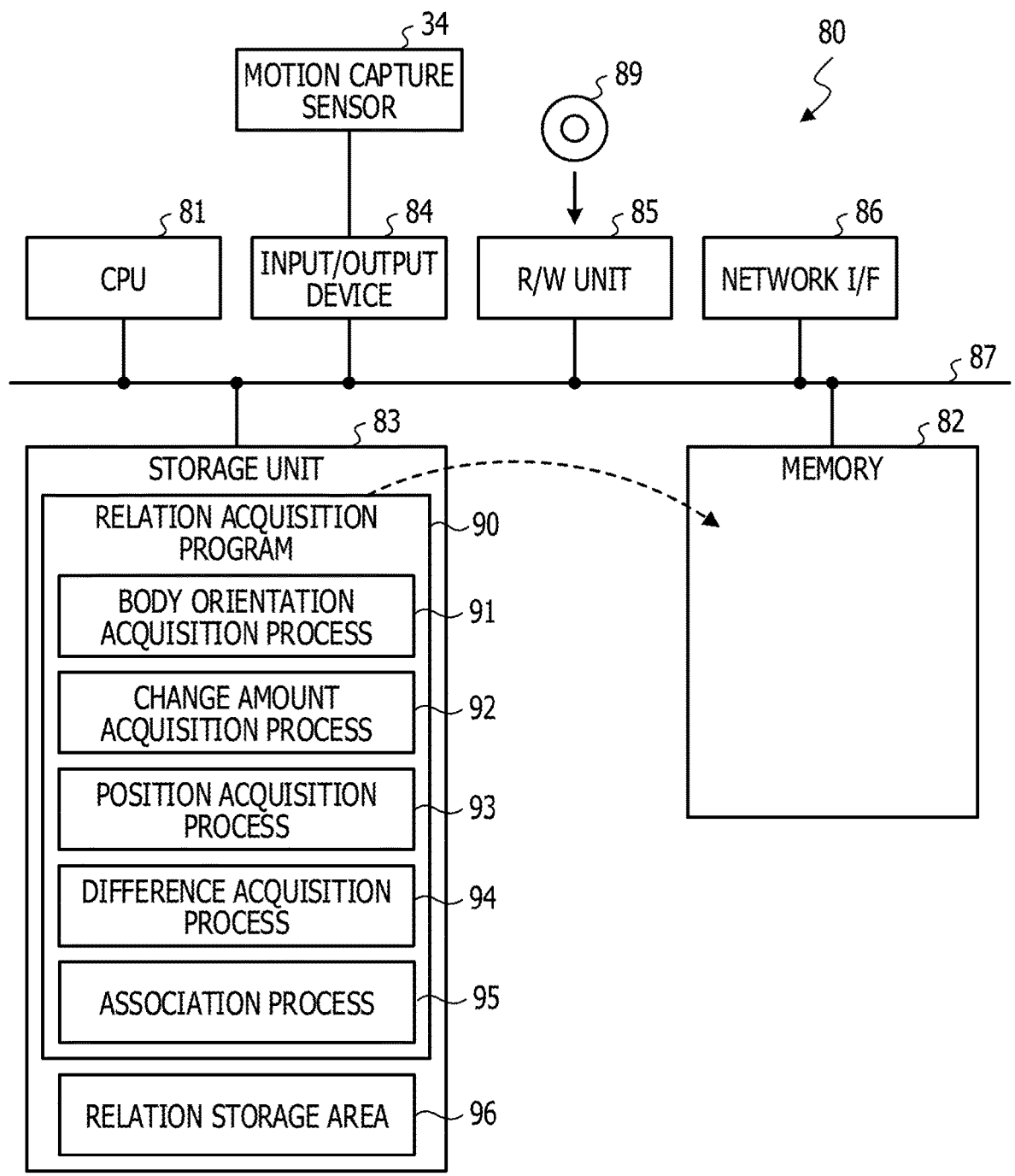
FIG. 11 is a block diagram illustrating schematic configuration of a computer that functions as a relation acquisition device in accordance with the embodiment.

For example, the relation acquisition device 36 may be embodied as a computer 80 illustrated in FIG. 11. The computer 80 includes a CPU 81, a memory 82 that is a temporary storage area, and a nonvolatile storage unit 83. The computer 80 also includes an input/output interface (I/F) 84 to which an input/output device such as the motion capture sensor 34 is connected, and a read/write (R/W) unit 85 for controlling reading/writing data from/to a recording medium 89. The computer 80 also includes a network I/F 86 connected to the network such as the Internet. The CPU 81, the memory 82, the storage unit 83, the input/output I/F 84, the R/W unit 85, and the network I/F 86 are interconnected via a bus 87.

The storage unit 83 may be embodied as the HDD, the SSD, a flash memory, or the like. The storage unit 83 that is a storage medium stores a relation acquisition program 90 that causes the computer 80 to function as the relation acquisition device 36. The relation acquisition program 90 has a body orientation acquisition process 91, a change amount acquisition process 92, a position acquisition process 93, a difference acquisition process 94, and an association process 95. The relation storage area 96 stores information constituting the relation storage unit 43.

The CPU 81 reads the relation acquisition program 90 from the storage unit 83, expands the read relation acquisition program 90 into the memory 82, and sequentially executes the processes of the relation acquisition program 90. The CPU 81 executes the body orientation acquisition process 91, thereby operating as the body orientation acquisition unit 38 illustrated in FIG. 9. The CPU 81 also executes the change amount acquisition process 92, thereby operating as the change amount acquisition unit 39 illustrated in FIG. 9. The CPU 81 also executes the position acquisition process 93, thereby operating as the position acquisition unit 40 illustrated in FIG. 9. The CPU 81 also executes the difference acquisition process 94, thereby operating as the difference acquisition unit 41 illustrated in FIG. 9. The CPU 81 also executes the association process 95, thereby operating as the association unit 42 illustrated in FIG. 9. The CPU 81 also reads information from the relation storage area 96, and expands the relation storage unit 43 into the memory 82. Thereby, the computer 80 executing the relation acquisition program 90 functions as the relation acquisition device 36. The CPU 81 that is hardware executes the relation acquisition program 90 that is software.

The function achieved by the relation acquisition program 90 may be achieved by a semiconductor integrated circuit, in particular, an ASIC or the like.

Figure 12:
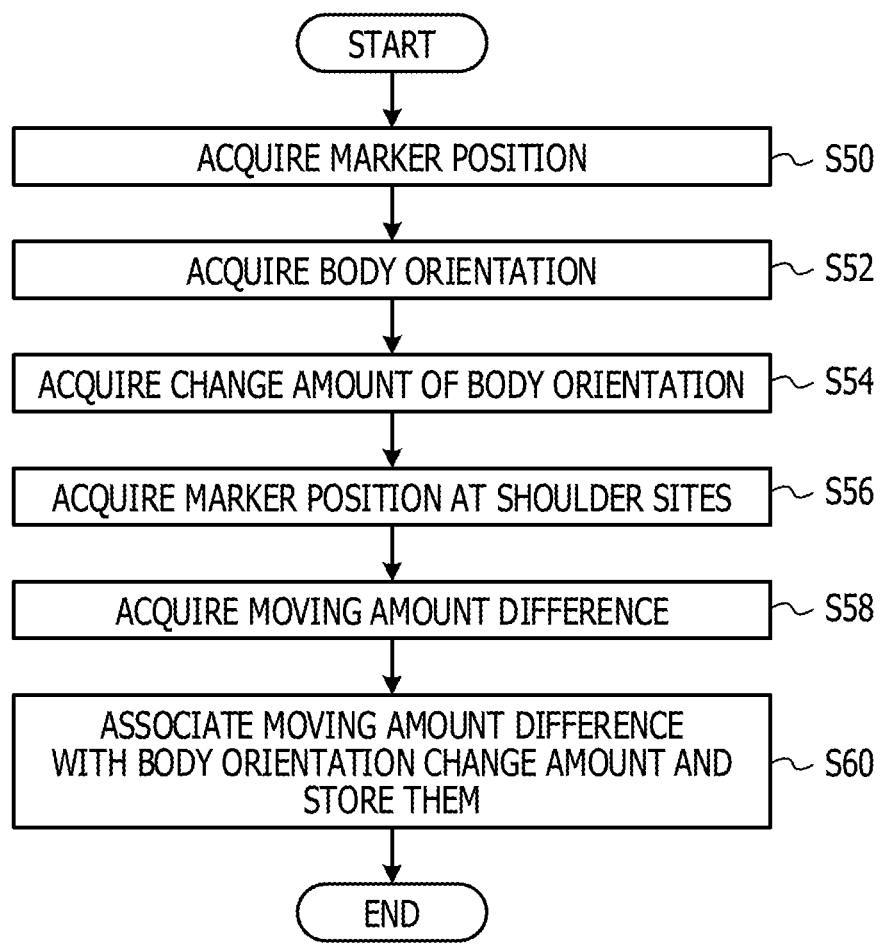
FIG. 12 is a flow chart illustrating an example of relation acquisition processing routine in the embodiment.

Next, actions of the relation acquisition device 36 in accordance with this embodiment will be described. When the motion capture sensor 34 starts to detect positions of the markers attached to the person, the relation acquisition device 36 executes a relation acquisition processing routine illustrated in FIG. 12. The relation acquisition processing routine illustrated in FIG. 12 is repeatedly executed.

In Step S50, the body orientation acquisition unit 38 acquires the position of each marker at the previous time and the position of each marker at the current time, which are detected by the motion capture sensor 34.

In Step S52, the body orientation acquisition unit 38 acquires the body orientation at the previous time and the body orientation at the current time, based on the position of each marker at the previous time and the position of each marker at the current time, which are acquired in Step S50.

In Step S54, the change amount acquisition unit 39 acquires a difference between the body orientation at the previous time and the body orientation at the current time which are acquired in Step S52, as the body orientation change amount.

In Step S56, the position acquisition unit 40 acquires the positions of the marker in the left site at the previous time and the current time, which are detected by the motion capture sensor 34. The position acquisition unit 40 also acquires the positions of the marker in the right site at the previous time and the current time, which are detected by the motion capture sensor 34.

In Step S58, the difference acquisition unit 41 acquires the left moving amount indicating the moving amount between the position of the marker in the left site at the previous time and the position of the marker in the left site at the current time, which are acquired in Step S56. The difference acquisition unit 41 also acquires the right moving amount indicating the moving amount between the position of the marker in the right site at the previous time and the position of the marker in the right site at the current time, which are acquired in Step S56. Then, the difference acquisition unit 41 acquires the moving amount difference indicating the difference between the left moving amount and the right moving amount.

In Step S60, the association unit 42 associates the moving amount difference acquired in Step S58 with the body orientation change amount acquired in Step S54, and stores them in the relation storage unit 43.

Figure 13:
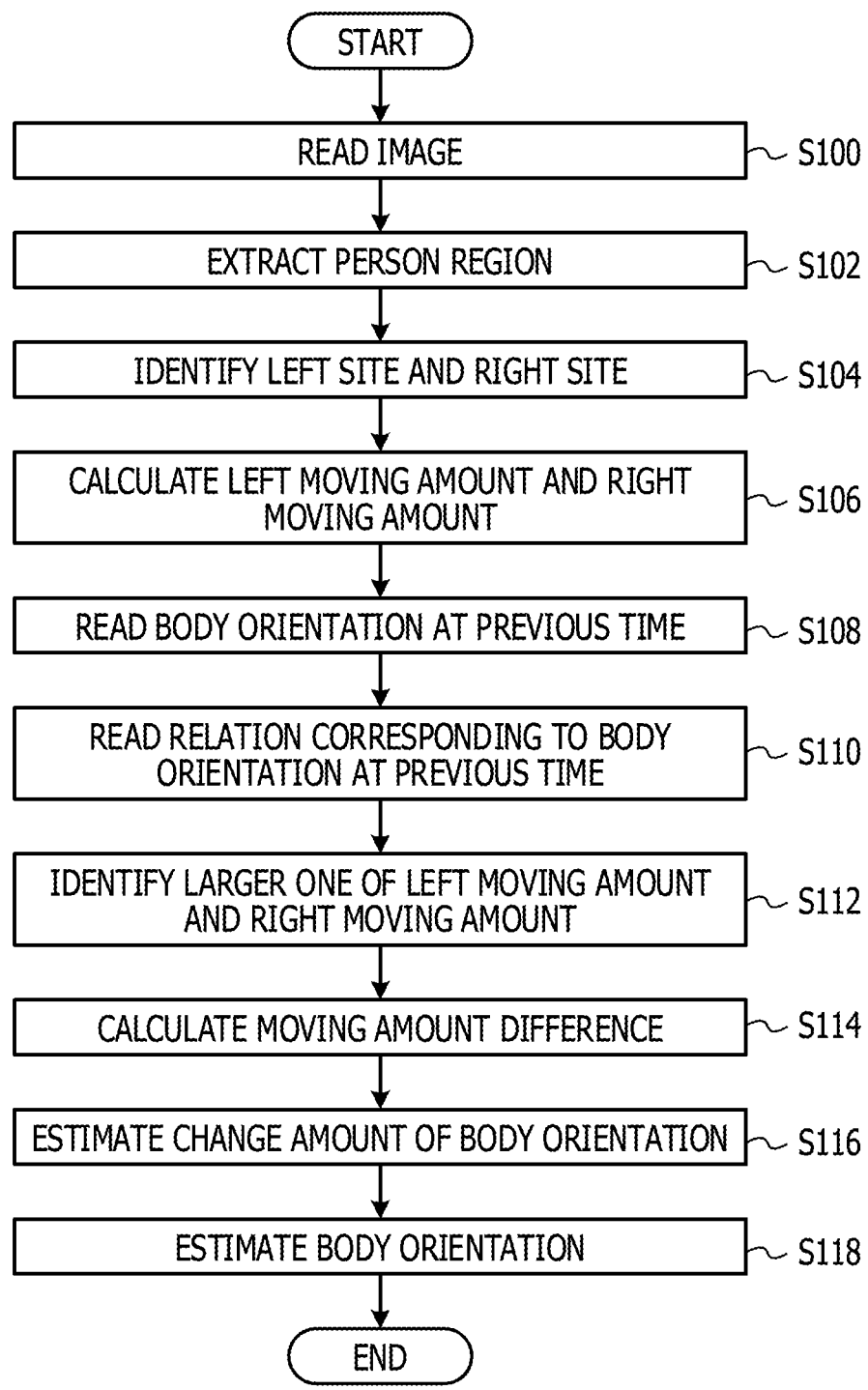
FIG. 13 is a flow chart illustrating an example of body orientation estimation routine in the embodiment.

Next, actions of the body orientation estimation device 14 in accordance with this embodiment will be described. When a predetermined relation is stored in the relation storage unit 43 of the relation acquisition device 36, information about the relation is stored in the relation storage unit 27 of the body orientation estimation device 14. Then, the camera 12 of the body orientation estimation system 10 starts to take images, and the acquisition unit 20 acquires the images. Then, the images acquired by the acquisition unit 20 are sequentially stored in the image storage unit 21. When accepting a predetermined instruction signal, the body orientation estimation device 14 executes a body orientation estimation routine illustrated in FIG. 13. The body orientation estimation routine illustrated in FIG. 13 is repeatedly executed.

In Step S100, the region extraction unit 22 reads the image taken at the previous time and the image taken at the current time from the images stored in the image storage unit 21.

In Step S102, the region extraction unit 22 extracts the person region from the image at the previous time read in Step S100. The region extraction unit 22 also extracts the person region at the current time read in Step S100.

In Step S104, the identification unit 24 extracts HOG feature amounts at a plurality of feature points from the person region at each time extracted in Step S102. Then, the identification unit 24 identifies the left sites in the images at the previous time and the current time, and the right sites in the images at the previous time and the current time, based on the HOG feature amounts extracted from the plurality of feature points and the feature amount previously stored in the feature storage unit 23.

In Step S106, the calculation unit 25 calculates the left moving amount based on the left site at the previous time and the left site at the current time, which are identified in Step S104. The calculation unit 25 also calculates the right moving amount based on the right site at the previous time and the right site at the current time, which are identified in Step S104.

In Step S108, the estimation unit 28 reads the body orientation at the previous time already estimated according to the previous processing from the orientation storage unit 26.

In Step S110, the estimation unit 28 reads the relation between the moving amount difference D and the body orientation change amount θ, which corresponds to the body orientation at the previous time read in Step S108, from the relation storage unit 27.

In Step S112, the estimation unit 28 identifies the larger moving amount of the left moving amount and the right moving amount, which are calculated in Step S106. Then, the estimation unit 28 selects either the relation G1A or the relation G1B in FIG. 6 according to the larger moving amount of the left moving amount and the right moving amount.

In Step S114, the estimation unit 28 calculates the moving amount difference based on the left moving amount and the right moving amount, which are calculated in Step S106.

In Step S116, based on the moving amount difference calculated in Step S114 and the relation between the moving amount difference D and the body orientation change amount θ, which is selected in Step S112, the estimation unit 28 estimates a change amount from the body orientation at the previous time to the body orientation at the current time.

In Step S118, the body orientation at the previous time read in Step S108 and the body orientation change amount estimated in Step S116, the estimation unit 28 estimates the body orientation of the person in the person region at the current time. The estimation unit 28 also updates the estimated body orientation at the previous time in the orientation storage unit 26 to the body orientation at the current time estimated in Step S118.

The output device 30 outputs the body orientation at the current time, which is estimated by the estimation unit 28, as a result.

As has been described, the body orientation estimation device in accordance with this embodiment calculates the left moving amount indicating the moving amount between the left site at the previous time and the left site at the current time in the person region, and the right moving amount indicating the moving amount between the right site at the previous time and the right site at the current time in the person region. Then, the body orientation estimation device estimates the body orientation of the person in the person region at the current time, based on the moving amount difference between the left moving amount and the right moving amount, and the relation between the moving amount difference and the body orientation change amount. This may accurately estimate the body orientation of the person in the image.

By using the left site and the right site in the person region, even when the person region rotates on the image, and the person region slides on the image in the crosswise direction, wrong estimation of the body orientation is suppressed.

In addition, in the scene of businesses made via communication, such as retail, health care, and education, the body orientation of the person may be accurately estimated, thereby acquiring important information for grasping the psychological state of the person.

Next, examples of the body orientation estimation system 10 in accordance with this embodiment will be described.

Example 1

Figure 14:
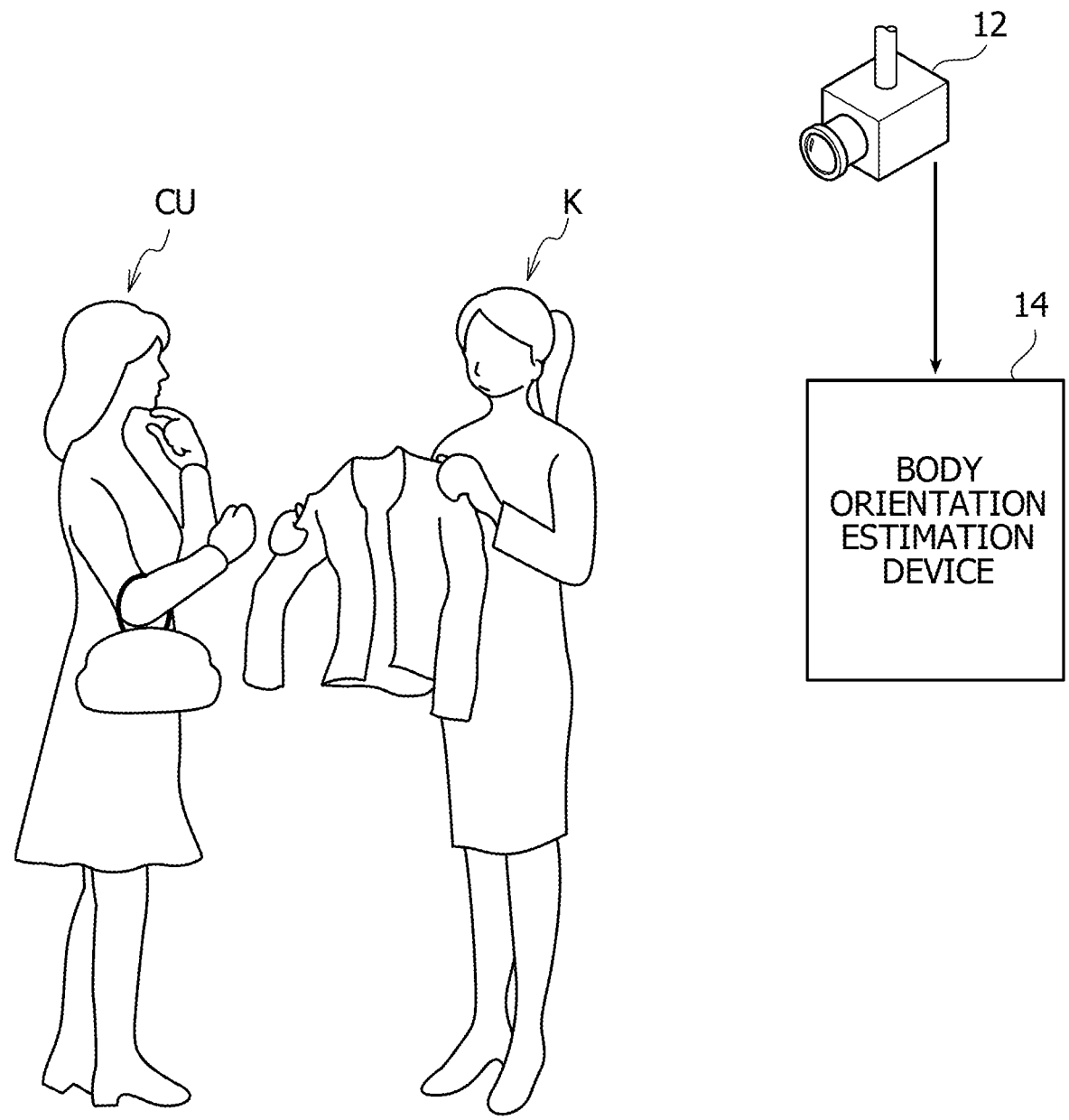
FIG. 14 illustrates Example in accordance with the embodiment.

One of examples of usage of the body orientation estimation system 10 in accordance with this embodiment is assistance of attending of customers for salesclerks in shops. As illustrated in FIG. 14, the body orientation estimation device 14 in this embodiment inputs a video taken by the camera 12, and estimates the body orientation of a customer CU based on each frame image in the video to estimate goods that may attract the customer's interest. Then, for assistance to attending of the customer, a salesclerk K may acquire feedback on information about the on goods that may attract the customer's interest.

Example 2

One of examples of usage of the body orientation estimation system 10 in accordance with this embodiment is the acquisition of the state of students in a lesson of school. As illustrated in FIG. 15, the body orientation estimation device 14 in this embodiment inputs a video taken by the camera 12, and estimates the body orientation of each of students ST1, ST2, ST3, and ST4. Then, the level of the interest of each of the students ST1, ST2, ST3, and ST4 in contents of the lesson is estimated to give feedback to a teacher T.

In this case, a plurality of persons are included in the image. For this reason, to extract the person region, the region extraction unit 22 extracts the plurality of person regions in the image. To identify the left site and the right site, the identification unit 24 also identifies the right site and the left site for each of the plurality of person regions. To calculate the left moving amount and the right moving amount, the calculation unit 25 also calculates the left moving amount and the right moving amount for each of the plurality of person regions. To estimate the body orientation at the current time, the estimation unit 28 also estimates the body orientation of the persons in the person region at the current time for each of the plurality of person regions.

In this case, to estimate the level of the interest of each of the students ST1, ST2, ST3, and ST4 in contents of the lesson, for example, when the body orientation of each of the students ST1, ST2, ST3, and ST4 is the front, it is estimated that the level of the interest of each of the students ST1, ST2, ST3, and ST4 is high. When the body orientation of each of the students ST1, ST2, ST3, and ST4 is not the front, it is estimated that the level of the interest of each of the students ST1, ST2, ST3, and ST4 is low.

Example 3

One of examples of usage of the body orientation estimation system 10 in accordance with this embodiment is recording of the state of students during a lesson in a form of video to make use of the video for education and evaluation of a teacher. In this case, the body orientation estimation device 14 in the embodiment inputs a video taken by the camera 12 and estimates the body orientation of each student in each class. Then, the body orientation estimation device 14 in the embodiment transmits information about the body orientation of each student in each class to a server, and an administrator of the server makes use of the information for education and evaluation of a teacher of each class.

The embodiment in which each program is previously stored (installed) in the storage unit has been described and however, the present disclosure is not limited to the embodiment. The program of disclosed technique may be offered in a form recorded in a recording medium such as a CD-ROM, a DVD-ROM, and a USB memory.

All of the documents, patent applications, and technical standards in this specification are incorporated into this specification by reference to the extent that they are described specifically and independently.

Next, modifications of the embodiment will be described.

In the embodiment, the identification unit 24 identifies the left site and the right site based on the HOG feature amounts extracted from the plurality of feature points and the feature amount previously stored in the feature storage unit 23 and however, the present disclosure is not limited to this. For example, the identification unit 24 stores the positions of the feature points in the left site and the right site, which are identified from the person region at the previous time, in the predetermined storage unit (not illustrated). Then, when the left site and the right site are identified at the current time, the identification unit 24 may update the positions of the feature points in the left site and the right site at the previous time to the positions of the feature points in the left site and the right site at the current time. This may efficiently identify the left site and the right site.

To estimate the body orientation of the person, the estimation in this embodiment may be combined with another estimation method. For example, when the body orientation of the person is first estimated, a difference between the feature amount previously prepared for each body orientation and the feature amount extracted from the person region is calculated, and the body orientation leading to a minimum difference is estimated as the body orientation in the person region. Then, when the body orientation of the person is estimated at the next time, the body orientation may be estimated according to the estimation method in this embodiment, based on the body orientation estimated at the previous time according to another method.

In this embodiment, the shoulder sites are identified as an example of the left site and the right site and however, the present disclosure is not limited to this. For example, ears of the person may be identified as the left site and the right site.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for estimating body orientation, the method comprising:
   executing a region extraction processing that includes extracting a person region from a plurality of images, the person region corresponding to a region of a person, the plurality of images including an image taken at a first time point and an image taken at a second time point after the first time point;
   executing an identification processing that includes identifying a first body part and a second body part in the person region from each image at the first time point and the second time point, the first body part being a left shoulder of the person in the person region, the second body part being a right shoulder of the person in the person region;
   executing a calculation processing that includes calculating a first moving amount and a second moving amount, the first moving amount indicating a moving amount between a position of the first body part at the first time point and a position of the first body part at the second time point, the second moving amount indicating a moving amount between a position of the second body part at the first time point and a position of the second body part at the second time point; and
   executing an estimation processing that includes:
      in response to detecting that the first moving amount is larger than the second moving amount, estimating body orientation of the person in the person region at the second time point by using first relation information and a difference between the first moving amount and the second moving amount, the first relation information indicating a relationship between the difference and a first change amount of the body orientation when the person rotates clockwise; and
      in response to detecting that the second moving amount is larger than the first moving amount, estimating the body orientation of the person in the person region at the second time by using second relation information and the difference, the second relation information indicating a relationship between the difference and a second change amount of the body orientation when the person rotates counter-clockwise.

2. The method according to claim 1, wherein
   the first relation information and the second relation information are set for each body orientation at the first time point,
   the estimation processing is configured to:
      in response to detecting that the first moving amount is larger than the second moving amount, identify the first relation information corresponding to the estimated body orientation at the first time point; and
      in response to detecting that the second moving amount is larger than the first moving amount, identify the second relation information corresponding to the estimated body orientation at the first time point.

3. The method according to claim 1, wherein the identification processing is configured to use feature amounts at a plurality of feature points extracted from the person region in order to identify the first body part and the second body part.

4. The method according to claim 3, further comprising:
   storing, as first feature points associated with the first time point, second feature points identified from the person region at the second time point; and
   storing the estimated body orientation at the second time as the body orientation at the first time.

5. The method according to claim 1, wherein
   the region extraction processing is configured to extract a plurality of person regions in an image,
   the identification processing is configured to identify, for each of the plurality of person regions, the first body part in the person region and the second body part in the person region,
   the calculation processing is configured to calculate, for each of the plurality of person regions, the first moving amount and the second moving amount, and
   the estimation processing is configured to estimate, for each of the plurality of person regions, the body orientation of the person in the person region at the second time.

6. An apparatus for estimating body orientation, the apparatus comprising:
   a memory;
   a processor coupled to the memory, the processor being configured to execute a region extraction processing that includes extracting a person region from a plurality of images, the person region corresponding to a region of a person, the plurality of images including an image taken at a first time point and an image taken at a second time point after the first time point;

execute an identification processing that includes identifying a first body part and a second body part in the person region from each image at the first time point and the second time point, the first body part being a left shoulder of the person in the person region, the second body part being a right shoulder of the person in the person region;

execute a calculation processing that includes calculating a first moving amount and a second moving amount, the first moving amount indicating a moving amount between a position of the first body part at the first time point and a position of the first body part at the second time point, the second moving amount indicating a moving amount between a position of the second body part at the first time point and a position of the second body part at the second time point; and execute an estimation processing that includes:
  in response to detecting that the first moving amount is larger than the second moving amount, estimating body orientation of the person in the person region at the second time point by using first relation information and a difference between the first moving amount and the second moving amount, the first relation information indicating a relationship between the difference and a first change amount of the body orientation when the person rotates clockwise; and
  in response to detecting that the second moving amount is larger than the first moving amount, estimating the body orientation of the person in the person region at the second time point by using second relation information and the difference, the second relation information indicating a relationship between the difference and a second change amount of the body orientation when the person rotates counter-clockwise.

7. The apparatus according to claim 6, wherein
the first relation information and the second relation information are set for each body orientation at the first time point,
the estimation processing is configured to:
  in response to detecting that the first moving amount is larger than the second moving amount, identify the first relation information corresponding to the estimated body orientation at the first time point; and
  in response to detecting that the second moving amount is larger than the first moving amount, identify the second relation information corresponding to the estimated body orientation at the first time point.

8. The apparatus according to claim 6, wherein the identification processing is configured to use feature amounts at a plurality of feature points extracted from the person region in order to identify the first body part and the second body part.

9. The apparatus according to claim 8,
wherein the processor is configured to
  store, as first feature points associated with the first time point, second feature points identified from the person region at the second time point; and
  store the estimated body orientation at the second time as the body orientation at the first time.

10. The method according to claim 6,
wherein the region extraction processing is configured to extract a plurality of person regions in an image,
wherein the identification processing is configured to identify, for each of the plurality of person regions, the first body part in the person region and the second body part in the person region,
wherein the calculation processing is configured to calculate, for each of the plurality of person regions, the first moving amount and the second moving amount, and
wherein the estimation processing is configured to estimate, for each of the plurality of person regions, the body orientation of the person in the person region at the second time.

11. A non-transitory computer-readable storage medium for storing a program which causes a processor to perform processing for estimating body orientation, the processing comprising:
  executing a region extraction processing that includes extracting a person region from a plurality of images, the person region corresponding to a region of a person, the plurality of images including an image taken at a first time point and an image taken at a second time point after the first time point;
  executing an identification processing that includes identifying a first body part and a second body part in the person region from each image at the first time point and the second time point, the first body part being a left shoulder of the person in the person region, the second body part being a right shoulder of the person in the person region;
  executing a calculation processing that includes calculating a first moving amount and a second moving amount, the first moving amount indicating a moving amount between a position of the first body part at the first time point and a position of the first body part at the second time point, the second moving amount indicating a moving amount between a position of the second body part at the first time point and a position of the second body part at the second time point; and
  executing an estimation processing that includes:
    in response to detecting that the first moving amount is larger than the second moving amount, estimating body orientation of the person in the person region at the second time point by using first relation information and a difference between the first moving amount and the second moving amount, the first relation information indicating a relationship between the difference and a first change amount of the body orientation when the person rotates clockwise; and
    in response to detecting that the second moving amount is larger than the first moving amount, estimating the body orientation of the person in the person region at the second time by using second relation information and the difference, the second relation information indicating a relationship between the difference and a second change amount of the body orientation when the person rotates counter-clockwise.

12. The non-transitory computer-readable storage medium according to claim 11, wherein
the first relation information and the second relation information are set for each body orientation at the first time point,
the estimation processing is configured to:
  in response to detecting that the first moving amount is larger than the second moving amount, identify the first relation information corresponding to the estimated body orientation at the first time point; and in response to detecting that the second moving amount is larger than the first moving amount, identify the second relation information corresponding to the estimated body orientation at the first time point.

13. The non-transitory computer-readable storage medium according to claim 11, wherein the identification processing is configured to use feature amounts at a plurality of feature points extracted from the person region in order to identify the first body part and the second body part.

14. The non-transitory computer-readable storage medium according to claim 13,
wherein the processing further includes
storing, as first feature points associated with the first time point, second feature points identified from the person region at the second time point; and
storing the estimated body orientation at the second time as the body orientation at the first time.

15. The non-transitory computer-readable storage medium according to claim 11,
wherein the region extraction processing is configured to extract a plurality of person regions in an image,
wherein the identification processing is configured to identify, for each of the plurality of person regions, the first body part in the person region and the second body part in the person region,
wherein the calculation processing is configured to calculate, for each of the plurality of person regions, the first moving amount and the second moving amount, and
wherein the estimation processing is configured to estimate, for each of the plurality of person regions, the body orientation of the person in the person region at the second time.

* * * * *